(12) United States Patent
Hara (10) Patent No.: US 7,186,323 B2
(45) Date of Patent: Mar. 6, 2007

(54) ELECTROLYZED WATER PRODUCTION SYSTEM

(75) Inventor: Yasuo Hara, Aichi (JP)

(73) Assignee: Hoshizaki Denki Kabushiki Kaisha (JP)

(*) Notice: Subject to any disclaimer, the term of this patent is extended or adjusted under 35 U.S.C. 154(b) by 578 days.

(21) Appl. No.: 10/764,443

(22) Filed: Jan. 27, 2004

(65) Prior Publication Data

US 2004/0256243 A1 Dec. 23, 2004

(30) Foreign Application Priority Data

Jan. 28, 2003 (JP) .............................. 2003-019281

(51) Int. Cl.
*C25B 9/00* (2006.01)
*C02F 1/461* (2006.01)

(52) U.S. Cl. ............... 204/228.1; 204/275.1; 205/743; 205/751

(58) Field of Classification Search ............ 204/228.1, 204/242, 252, 263–264, 275.1; 205/628, 205/742–751
See application file for complete search history.

(56) References Cited

U.S. PATENT DOCUMENTS 5,944,978 A * 8/1999 Okazaki .................... 205/701

FOREIGN PATENT DOCUMENTS

JP 05-049092 U1 6/1993
JP 07-016570 A1 1/1995

* cited by examiner

*Primary Examiner*—Roy King
*Assistant Examiner*—Nicholas A. Smith
(74) *Attorney, Agent, or Firm*—Rader, Fishman & Grauer PLLC (57) ABSTRACT

An electrolytic ion-water production apparatus in which purified water without residual chlorine is electrolyzed to produce alkaline-ion water without any chloride smell of lime in use of the apparatus, and in which a mixture of purified water treated by a water purifier and tap water containing residual chlorine is electrolyzed to produce alkaline-ion water containing sodium hypochlorous acid (NaOCl) of low concentration and to retain the produced alkaline-ion water in an introduction passage for reliably preventing propagation of microbes.

6 Claims, 6 Drawing Sheets

ELECTROLYZED WATER PRODUCTION SYSTEM

BACKGROUND OF THE INVENTION

1. Field of the Invention

The present invention relates to an electrolytic ion-water production apparatus in which an electrolytic cell is provided to electrolyze tap water supplied from a tap water supply conduit through a water purifier for eliminating residual chlorine thereby to produce acid-ion water and alkaline-ion water.

2. Description of Prior Art

Disclosed in Japanese Patent Laid-open Publication No. 7(1995)-16570 is an electrolytic ion-water production apparatus of this kind in which an electrolytic cell is continuously supplied with tap water purified by a water purifying cartridge in connection to a tap water supply conduit and is applied with DC voltage at electrodes provided therein to electrolyze the purified tap water for producing alkaline-ion water and acid-ion water. The electrolytic ion-water production apparatus includes changeover means for selectively connecting the tap water supply conduit to either the water purifying cartridge or a bypass passage of the cartridge and control means for stopping power supply to the electrodes in the electrolytic cell when the changeover means is activated to connect the tap water supply conduit to the bypass passage of the water purifying cartridge.

In Japanese Utility Model Laid-open Publication No. 5(1993)-49092, there is disclosed changeover means disposed between each start end of a water supply portion and a water supply passage and each terminal end of a water circulation passage and a one-way bypass passage to alternately supply fresh tap water from the water supply portion to the water supply passage and the water circulation passage in accordance with operation of the changeover means. In this system, even if the tap water is remained in the water supply passage or the circulation passage, the remained water will be discharged by reverse flaw of the fresh tap water from the water supply portion so that propagation of microbes in the water supply passage and the circulation passage is prevented by germicidal function of chlorine contained in the fresh tap water.

In the ion-water production apparatus described above, fresh tap water is retained in an introduction passage of alkaline-ion water in a non-used condition of the apparatus so that propagation of microbes is prevented by residual chlorine in the fresh tap water. It has been proposed to changeover the introduction passages of alkaline-ion water and acid-ion water discharged from the electrolytic cell thereby to supply the acid-ion water into the introduction passage of alkaline-ion water for prevention of propagation of microbes.

The fresh tap water is, however, approximately neutral (in an extent of pH 5.8~pH8.6 defined under the tap water law). Accordingly, the residual chlorine contained in the tap water is in the form of hypochlorous acid (HOCl) which is superior in quick effect of sterilization but inferior in durability of the sterilization effect. The concentration of hypochlorous acid is, however, decreased in accordance with lapse of a time. As the pH of residual chlorine contained in the acid-ion water is low, the residual chlorine is in form of hypochlorous acid and chlorine ($Cl_2$) which are superior in sterilization effect but inferior in durability. Additionally, as chlorine gas soaks into the conduit material of the introduction passage of alkaline-ion water, foul smell of chlorine is mixed with alkaline-ion water produced at the next use of the apparatus.

SUMMARY OF THE INVENTION

It is, therefore, a primary object of the present invention to provide an electrolytic ion-water production apparatus designed to produce alkaline-ion water without any chloride smell of lime by electrolysis of fresh water without residual chlorine in use of the apparatus and to produce alkaline-ion water containing sodium hypochlorous acid (NaOCl) of low concentration by electrolysis of a mixture of purified water treated by a water purifier and tap water containing residual chlorine thereby to retain the produced alkaline-ion water so that propagation of microbes is reliably prevented.

According to the present invention, the object is attained by providing an electrolytic ion-water production apparatus, including an electrolytic cell connected to a tap water supply conduit through a water purifier for elimination of residual hypochlorous acid to be supplied with purified tap water for producing acid-ion water and alkaline-ion water by electrolysis of the supplied tap water when applied with DC voltage at a pair of opposed electrodes provided therein, discharge conduits provided to respectively discharge acid-ion water and alkaline-ion water produced in the electrolytic cell, and a faucet provided on the discharge conduit of alkaline-ion water, wherein electric control means of the electrolytic ion-water production apparatus comprises a first electromagnetic on-off valve bifurcated from the discharge conduit at an upstream of the faucet; a second electromagnetic on-off valve disposed in a bypass conduit bifurcated from the tap water supply conduit at an upstream of the water purifier and connected to the tap water supply conduit at a downstream of the water purifier; electrolytic current control means for applying DC voltage between said electrodes when the faucet is opened to cause flow of the purified tap water supplied into the electrolytic cell through the water purifier in a condition where both the first and second electromagnetic on-off valves have been closed and for stopping the power supply to said electrodes when the faucet is closed; and germicidal treatment means for starting measurement of a predetermined stopping time when the power supply to said electrodes has been stopped by closing of the faucet, opening both the first and second electromagnetic on-off valves upon lapse of the predetermined stopping time, applying DC voltage to said electrodes when the electrolytic cell is supplied with a mixture of purified water from the water purifier and the tap water from the bypass conduit, and closing both the first and second electromagnetic on-off valves and stopping the power supply to said electrodes upon lapse of a predetermined time for germicidal treatment In the electrolytic ion-water production apparatus, alkaline-ion water without any chloride smell of lime is produced in an asepsis condition when the faucet is opened in operation of the apparatus in a condition where both the first and second electromagnetic on-off valves have been closed. When the production apparatus is left in a condition where the faucet was closed, the first and second electromagnetic on-off valves are automatically opened under control of the electric control means after lapse of the predetermined stopping time (for instance, two hours) thereby to produce alkaline-ion water of sodium hypochlorous acid of low concentration by electrolysis of a mixture of purified water from the water purifier and the tap water containing residual chlorine from the tap water supply conduit for the predetermined time for germicidal treatment. Accordingly, the alkaline-ion water containing sodium hypochlorous acid of low concentration is retained in the interior of the electrolytic cell and the discharge conduit of alkaline-ion water so that propagation of harmful microbes is reliably prevented by durable germicidal power of the sodium hypochlorous acid.

Although in the electrolytic ion-water production apparatus, the faucet to be operated by a user is provided on the discharge conduit of alkaline-ion water, the faucet may be replaced with an electromagnetic on-off valve. In this case, a pour switch of water is provided to be operated by a user for use of alkaline-ion water, the electromagnetic on-off valve is adapted as the first electromagnetic on-off valve, and the first and second electromagnetic on-off valves are adapted as second and third electromagnetic on-off valves.

In a practical embodiment of the present invention, there is provided an electrolytic ion-water production apparatus, including an electrolytic cell connected to a tap water supply conduit through a water purifier for elimination of residual chlorine to be supplied with purified tap water for producing acid-ion water and alkaline-ion water by electrolysis of the supplied tap water when applied with DC voltage at a pair of opposed electrodes provided therein, and discharge conduits provided to respectively discharge acid-ion water and alkaline-ion water produced in the electrolytic cell, wherein electric control means of the electrolytic ion-water production apparatus comprises a pour switch of water adapted to be operated for use of the alkaline-ion water discharged from the discharge conduit; a first electromagnetic on-off valve disposed in the discharge conduit of alkaline-ion water; a second electromagnetic on-off valve disposed in a bypass conduit bifurcated from the water supply conduit at an upstream of the water purifier and connected to the water supply conduit at a downstream of the water purifier; electrolytic current control means for opening the first electromagnetic on-off valve and starting measurement of a predetermined time for pour of water when the pour switch of water has been operated in a condition where the second electromagnetic on-off valve was closed, applying DC voltage to said electrodes when the electrolytic cell is supplied with purified water from the water purifier, and closing the first electromagnetic on-off valve and stopping the power supply to said electrodes upon lapse of the predetermined time for pour of water; germicidal treatment means for starting measurement of a predetermined stopping time when the power supply to said electrodes has been stopped, opening both the first and second electromagnetic on-off valves upon lapse of the predetermined stopping time, applying DC voltage to said electrodes when the electrolytic cell is supplied with a mixture of purified water from the water purifier and the tap water from the bypass conduit, and closing both the first and second electromagnetic on-off valves and stopping the power supply to said electrodes upon lapse of a predetermined time for germicidal treatment In the practical embodiment, alkaline-ion water without any chloride smell of lime is produced in an asepsis condition when the faucet is opened in operation of the apparatus, and the alkaline-ion water can be provided as drinking water in a sanitary condition suitable for use immediately after produced or preserved in a cold condition. When the production apparatus is left in a non-used condition, the first and second electromagnetic on-off valves are automatically opened under control of the electric control means after lapse of the predetermined stopping time (for instance, two hours) thereby to produce alkaline-ion water of sodium hypochlorous acid of low concentration by electrolysis of a mixture of purified water from the water purifier and the tap water containing residual chlorine from the tap water supply conduit for the predetermined time for germicidal treatment. Accordingly, the alkaline-ion water containing sodium hypochlorous acid of low concentration is retained in the interior of the electrolytic cell and the discharge conduit of alkaline-ion water so that propagation of harmful microbes is reliably prevented by durable germicidal power of the sodium hypochlorous acid.

Although in the practical embodiment, the power supply to the electrodes is stopped upon lapse of the predetermined time for pour of water when the pour switch of water has been turned on, the power supply to the electrodes may be stopped when the pour switch of water has been operated without measurement of the predetermined time for pour of water.

DESCRIPTION OF THE PREFERRED EMBODIMENTS

Hereinafter, a preferred embodiment of the present invention will be described with reference to the drawings. An electrolytic ion-water production apparatus shown in FIG. 1 includes a softener 21 connected to a tap water supply conduit 11 through a main valve 12 for water supply and a pressure reduction valve 13, a water purifier 23 to be supplied through a filter 22 with tap water containing sodium ion Na+ exchanged in ion by means of ion-exchange resin in the water softener 21, an electrolytic cell 24 provided therein with a pair of electrodes that is applied with DC voltage to electrolyze the tap water purified by the water purifier 23 for eliminating residual chlorine thereby to produce acid-ion water and alkaline-ion water, a discharge conduit 25 for discharging the alkaline-ion water produced in the electrolytic cell 24 into a discharge tank T through a faucet TP, and a drain conduit 26 for introducing the acid-ion water produced in the electrolytic cell 24 into a drain tank 27 through a drain valve Va and an adjustment valve Vb for adjusting a drain amount of the acid-ion water. In addition, disposed between the water purifier 23 and the electrolytic cell 24 are a pressure reduction valve Vd, a relief valve Ve of pressure in the water supply passage and an adjustment valve Vf for adjusting a discharge amount of the alkaline-ion water.

Figure 1:
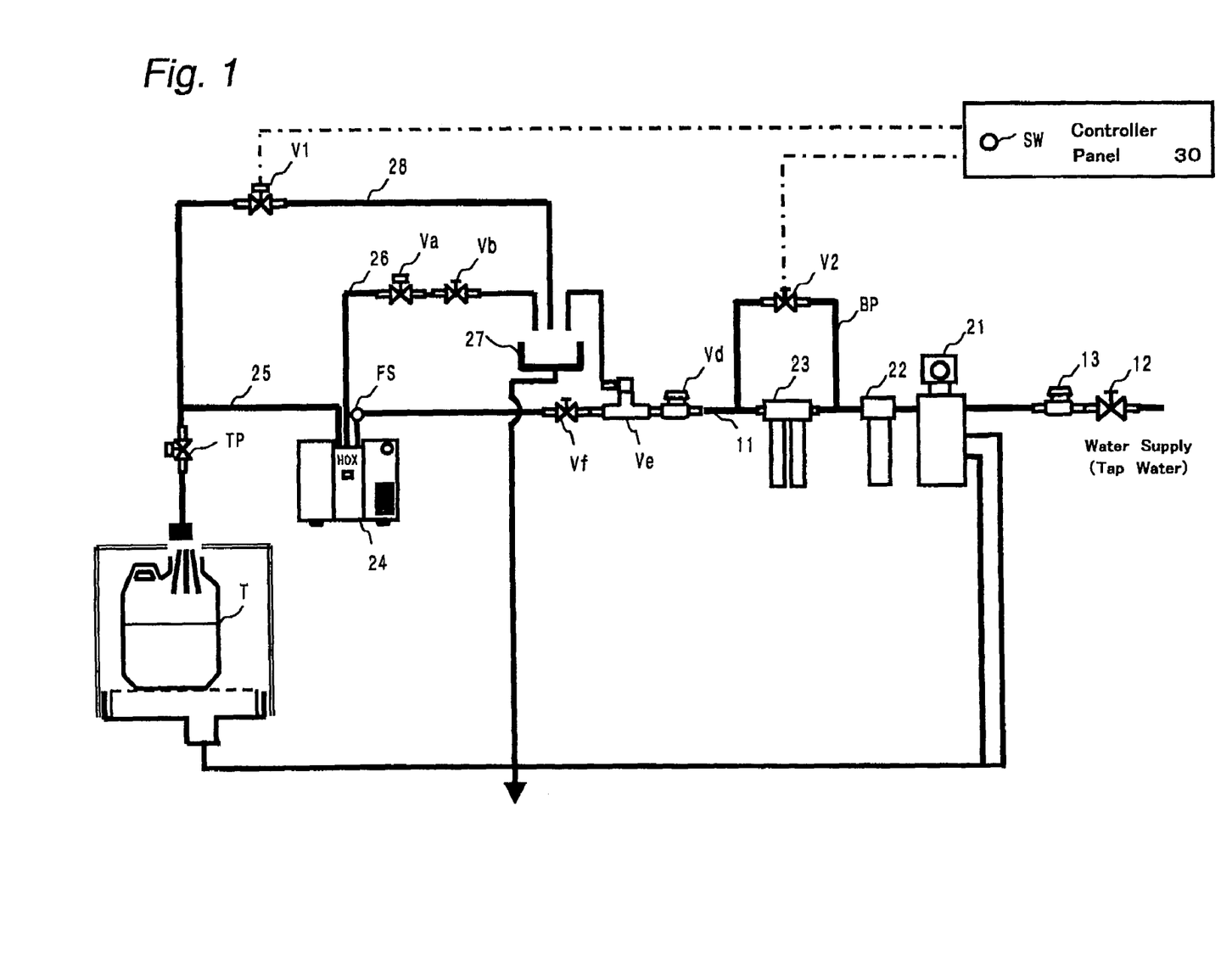
FIG. 1 is a schematic view of a preferred embodiment of an electrolytic ion-water production apparatus according to the present invention.

In the electrolytic ion-water production apparatus described above, a first electromagnetic on-off valve V1 is disposed in a drain conduit 28 bifurcated from the discharge conduit 25 at an upstream of the faucet TP, and a second electromagnetic on-off valve V2 for supply of the tap water is disposed in a bypass conduit BP bifurcated from the water supply conduit 11 at an upstream of the water purifier 23 and connected with the water supply conduit 11 at a downstream of the water purifier 23. The first electromagnetic on-off valve V1 is opened when energized under control of a microcomputer MC described later in a condition where the faucet TP has been closed to leave the apparatus in a non-used condition. When the second electromagnetic on-off valve V2 is opened under control of the microcomputer MC, the tap water containing residual chlorine is mixed with the tap water treated by the water purifier 23 at a predetermined ratio at the downstream of water purifier 23. In addition, a power source switch SW is provided on an electric controller panel 30 for control of electrolytic current applied to the electrodes in the electrolytic cell 24.

Figure 2:
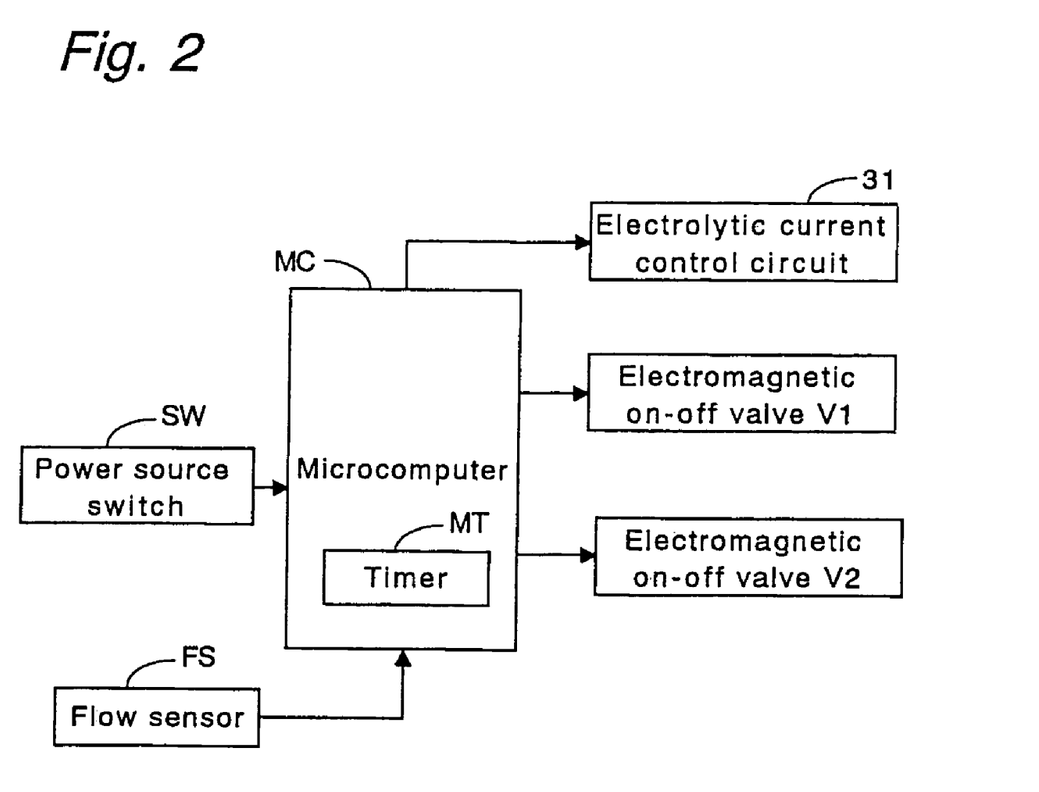
FIG. 2 is a block diagram of a control circuit of a microcomputer provided on an electric controller panel shown in FIG. 1.

Illustrated in FIG. 2 is the microcomputer MC provided on the electric controller panel 30. The microcomputer MC is connected at its input side to a flow sensor FS disposed in the water supply conduit in connection the electrolytic cell 24 and connected at its output side to an electrolytic current control circuit 31 and to the first and second electromagnetic on-off valves V1 and V2. The microcomputer MC is provided with a timer MT for measurement a predetermined time for supply of electrolytic current, a predetermined stopping time of the supply of electrolytic current and a predetermined time for germicidal treatment and is arranged to execute a control program of a routine for pour of tap water and sterilization shown in FIG. 3.

Figure 3:
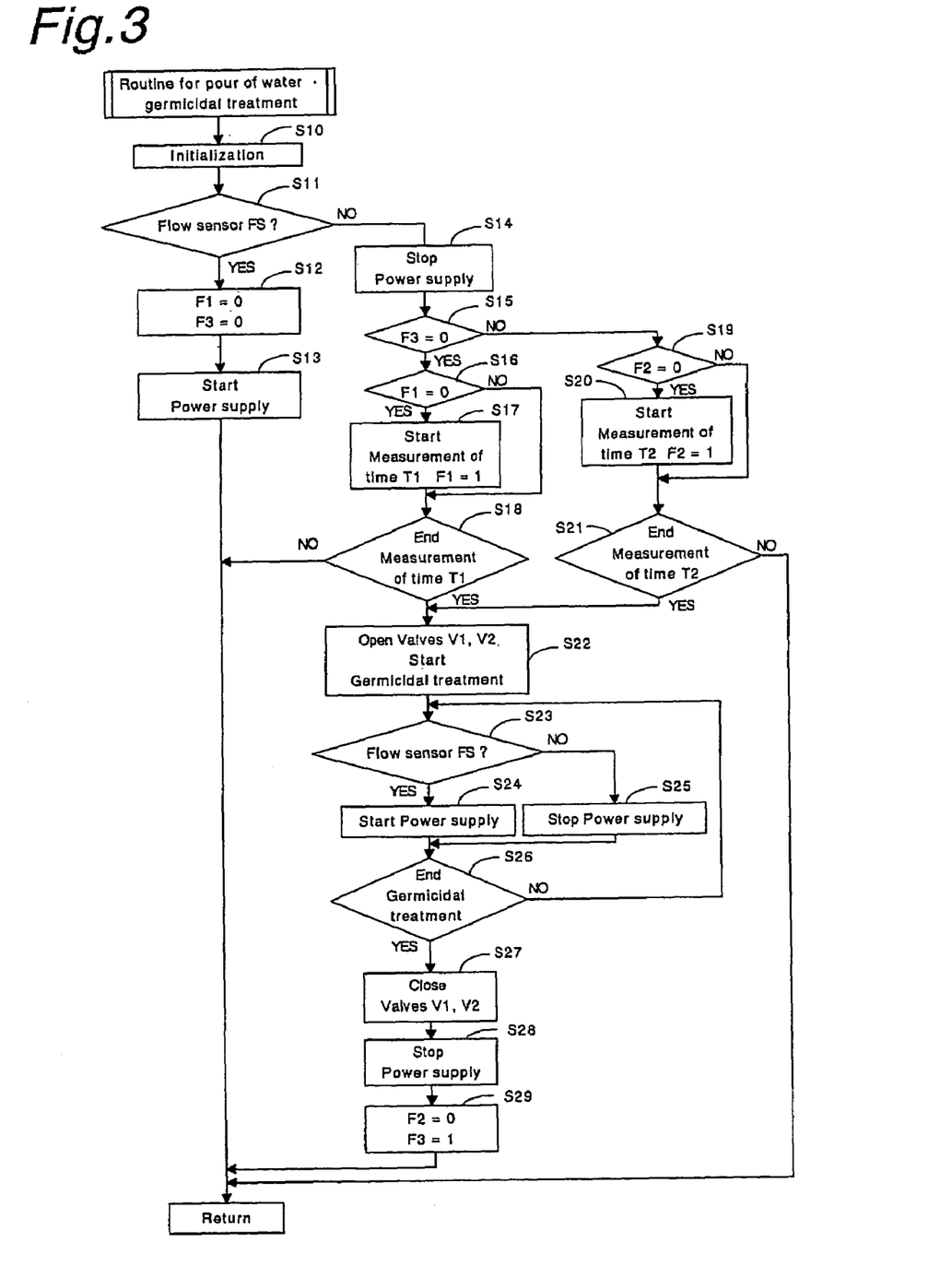
FIG. 3 is a control program of the electrolytic ion-water production apparatus executed by the microcomputer shown in FIG. 2.

When the power source switch SW on the controller panel 30 is closed and the faucet TP is opened in a condition where the main valve 12 for supply of the tap water has been opened, the tap water from the water supply conduit 11 is purified by the water purifier 23 to eliminate residual chlorine therefrom and is supplied into the electrolytic cell 24. When the flow of purified tap water into the electrolytic cell 24 is detected by the flow sensor FS, the computer MC initializes at step S10 a control program of the routine for pour of tap water and sterilization and determines a "Yes" answer at step S11. At the following step S12, the computer MC sets flags F1 and F3 as "0" and applies at step S13 a control signal for supply of DC voltage to the pair of electrodes in the electrolytic cell 24 to the electrolytic current control circuit 31. This causes production of acid-ion water and alkaline-ion water in the electrolytic cell 24. The alkaline-ion water is discharged through the discharge conduit 25 in a condition without containing any residual chlorine and stored in the discharge tank T, while the acid-ion water is discharged through the drain conduit 26 and drained in the drain tank 27. When the faucet TP is closed by a user after a predetermined amount of alkaline-ion water was stored in the discharge tank T, the flow of the tap water into the electrolytic cell 24 is stopped, and the computer MC determines a "No" answer at step S11 in response to a detection signal of the flow sensor FS and applies at step S14 a control signal for stopping the power supply to the electrodes in the electrolytic cell to the electrolytic current control circuit 31.

The alkaline-ion water stored in the discharge tank T during use of the apparatus can be provided as drinking water without any chloride smell of lime in a sanitary condition when used or preserved in a cold condition immediately after produced in the electrolytic cell 24.

When the production apparatus is left in a condition where the power supply to the electrodes in the electrolytic cell 24 was temporarily stopped after it has been used, the computer MC determines a "Yes" answer at step S15 and S16 and starts at step S17 to measure a predetermined time T1 of temporal stopping (for instance, one minute~few minutes) and sets the flag to "1". During lapse of the predetermined time T1, the computer MC determines "No" answer at step S16 and S18. Upon lapse of the predetermined time T1, the computer MC determines a "Yes" answer at step S18 and turns on at step S22 the first and second electromagnetic on-off valves V1 and V2 and starts at step S22 to measure a predetermined time for preliminary germicidal treatment. Thus, the purified tap water from the water purifier 23 is mixed with the tap water containing residual chlorine supplied through the bypass conduit BP and supplied into the electrolytic cell 24. When the flow of the mixed tap water is detected by the flow sensor FS, the computer MC determines a "Yes" answer at step S23 and applies at step S24 the control signal for supply of DC voltage to the electrodes in the electrolytic cell 24 to the electrolytic current control circuit 31. Thus, alkaline-ion water produced in the electrolytic cell 24 is in a condition containing sodium hypochlorous acid (NaOCl) of low concentration and discharged into the discharge tank 27 through the discharge conduit 28, while the acid-ion water produced in the electrolyzer 24 is discharged into the drain tank 27 through the drain conduit 26. Upon lapse of the predetermined time for preliminary germicidal treatment in operation of the production apparatus, the computer MC determines a "Yes" answer at step S26 and turns off at step S27 the first and second electromagnetic on-off valves V1 and V2. Thereafter, the computer MC applies a control signal for stopping the power supply to the electrodes in the electrolytic cell 24 to the electrolytic current control circuit 31 and sets at step S29 the flag F2 to "0" and the flag F3 to "1".

In case that the tap water may not be supplied due to suspension of water supply when the measurement of the time for preliminary germicidal treatment is started at step S22, any flow of the mixed tap water may not be detected by the flow sensor FS. In such an instance, the computer MC determines a "No" answer at step S23 and applies a control signal for stopping the power supply to the electrodes in the electrolytic cell 24 to the electrolytic current control circuit 31. This is useful to avoid unexpected damage of the electrolytic cell caused by heating during suspension of water supply.

When the production apparatus is not used after the preliminary germicidal treatment and left in a condition where the power supply to the electrodes in the electrolytic cell 24 was stopped, the computer MC determines a "No" answer at step S11 and S15 and determines a "Yes" answer at step S19. In such a stopped condition of the production apparatus, the computer MC starts to measure a predetermined continuous stopping time T2 (for instance, two hours) and sets the flag F2 to "1". During lapse of the continuous stopping time T2, the computer MC determines a "No" answer at step S21 and determines a "No" answer at step S19 to measure lapse of the continuous stopping time T2. Upon lapse of the continuous stopping time T2, the computer MC determines a "Yes" answer at step S21 and energizes at step S22 the first and second electromagnetic on-off valves V1 and V2 and starts to measure the predetermined time for germicidal treatment. Thus, the purified tap water from the water purifier 23 is mixed with the tap water containing residual chlorine supplied through the bypass conduit BP and supplied into the electrolytic cell 24. When the flow of the mixed tap water is detected by the flow sensor FS, the computer MC determines a "Yes" answer at step S23 and applies at step S24 the control signal for supply of DC voltage to the electrodes in the electrolytic cell 24 to the electrolytic current control circuit 31. Thus, alkaline-ion water produced in the electrolytic cell 24 is discharged in a condition containing sodium hypochlorous acid (NaCl) of low concentration into the discharge tank 27 through the discharge conduit 28, while the acid-ion water produced in the electrolytic cell 24 is discharged into the drain tank 27 through the drain conduit 26. Upon lapse of the predetermined time for preliminary germicidal treatment in operation of the production apparatus, the computer MC determines a "Yes" answer at step S26 and turns off at step S27 the first and second electromagnetic on-off valves V1 and V2. Thereafter, the computer MC applies a control signal for stopping the supply of DC voltage to the electrodes in the electrolytic cell 24 to the electrolytic current control circuit 31 and sets at step S29 the flag F2 to "0" and the flag F3 to "1".

As is understood from the above description, when the production apparatus has been temporarily stopped, harmful propagation of microbes is prevented by sodium hypochlorous acid contained in the alkaline-ion water remained in the discharge conduit 25, and the sodium hypochlorous acid of low concentration does not soak into the material of the discharge conduit since it is remained in the discharge conduit of alkaline-ion water only for a short period of time. This is useful to provide alkaline-ion water without any chloride smell of lime when produced in the next use of the apparatus. When the production apparatus was left in a non-used condition for a long period of time, propagation of harmful microbes can be prevented by durable germicidal power of sodium hypochlorous acid contained in the alkaline-ion water remained in the interior of electrolytic cell 24 and discharge conduit 25.

Although in the electrolytic ion-water production apparatus, the faucet TP to be operated by a user is provided on the discharge conduit 25 of alkaline-ion water, the faucet TP may be replaced with an electromagnetic on-off valve. In this case, a pour switch of water is provided on the controller panel 30 to be operated by a user for use of alkaline-ion water, the electromagnetic on-off valve is adapted as the first electromagnetic on-off valve, and the first and second electromagnetic on-off valves V1 and V2 are adapted as second and third electromagnetic on-off valves. In such a modification, the first electromagnetic on-off valve substituted for the faucet TP is turned on or off under control of the processing of the routine for pour of water and sterilization shown in FIG. 3. Other processing is substantially the same as that in the program shown in FIG. 3.

Figure 4:
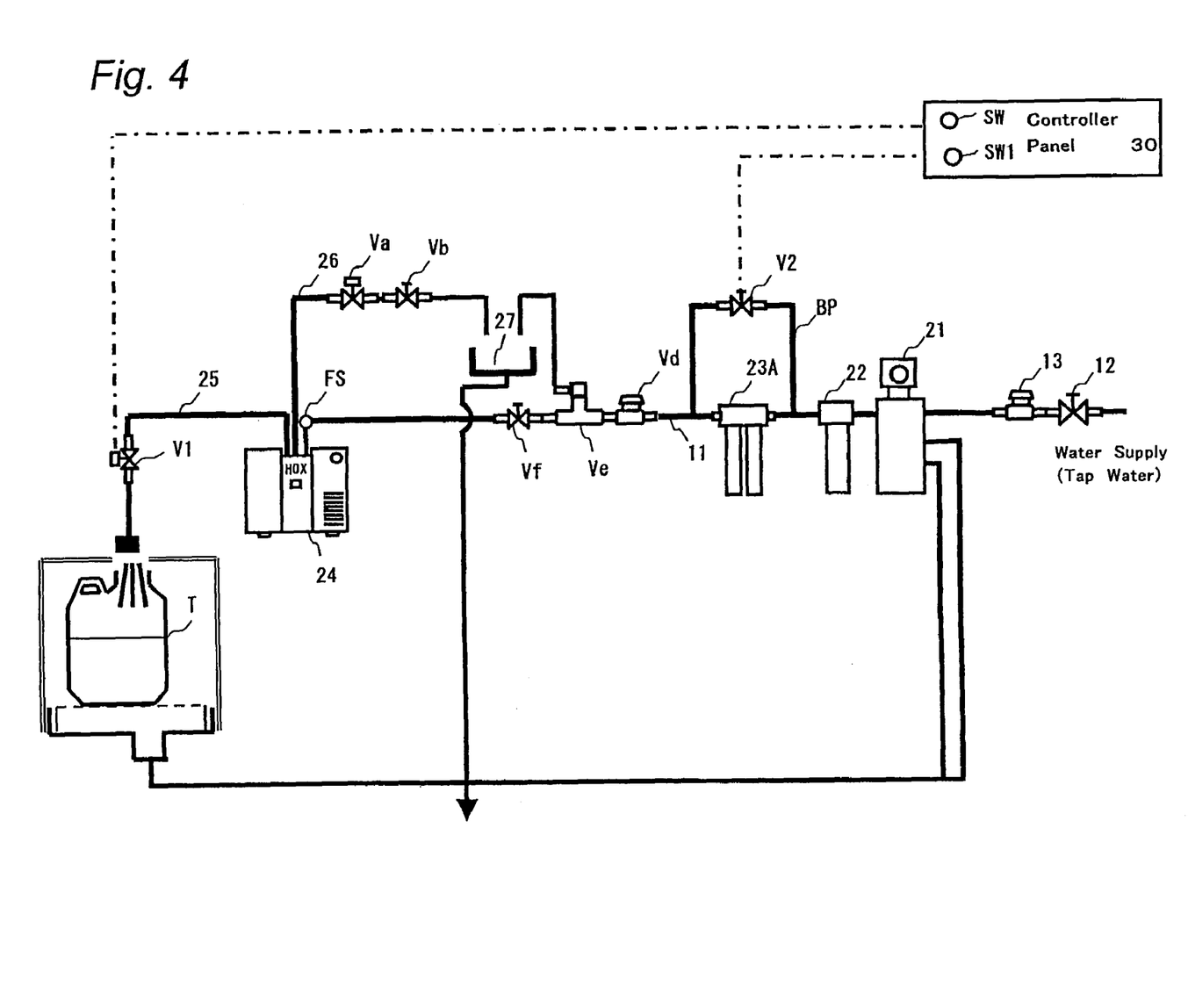
FIG. 4 is a schematic view of another preferred embodiment of the electrolytic ion-water production apparatus according to the present invention.
Figure 5:
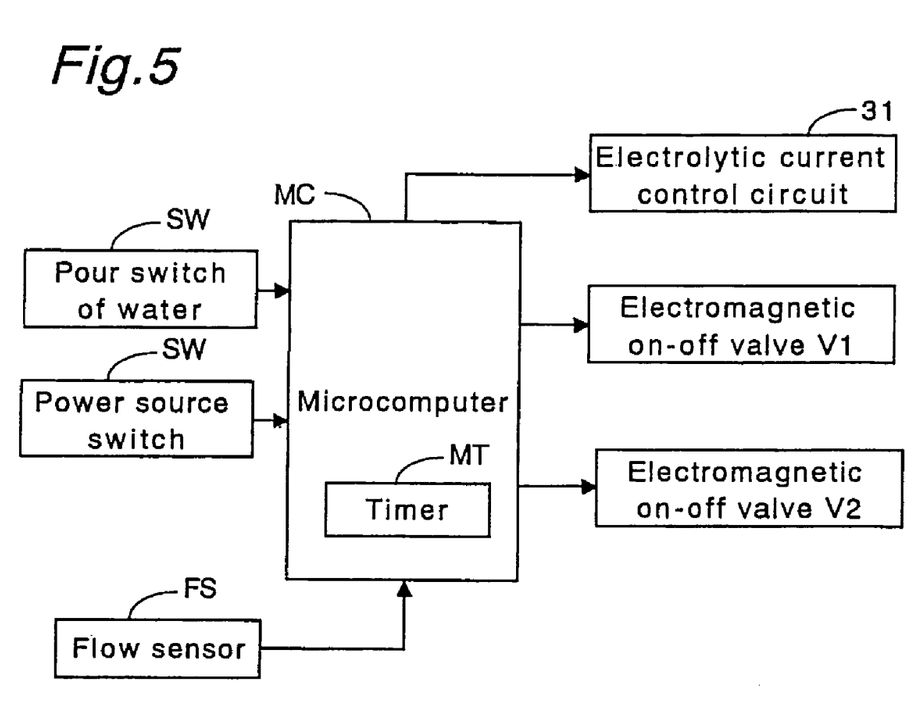
FIG. 5 is a block diagram of a control circuit of a microcomputer provided on an electric controller panel shown in FIG. 4.

Illustrated in FIG. 4 is another preferred embodiment of an electrolytic ion-water production apparatus in which a first electromagnetic on-off valve V1 substituted for the faucet TP shown in FIG. 1 is disposed in the discharge conduit 25 of alkaline-ion water and the drain conduit 28 bifurcated from the discharge conduit 25 at the upstream of the faucet TP is removed. As shown in FIG. 5, this embodiment is characterized in that a pour switch SW1 of water is provided in addition to the power source switch SW on the electric controller panel 30 and that the computer MC is connected at its input side to the pour switch SW1 in addition to the power source switch SW and flow sensor FS and connected at its output side to the electrolytic current control circuit 31 and the electromagnetic on-off valves V1 and V2. Other construction is substantially the same as that of the production apparatus shown in FIG. 2. Thus, the computer MC in this modification is arranged to execute a control program of a routine for pour of water and sterilization shown in FIG. 6.

Figure 6:
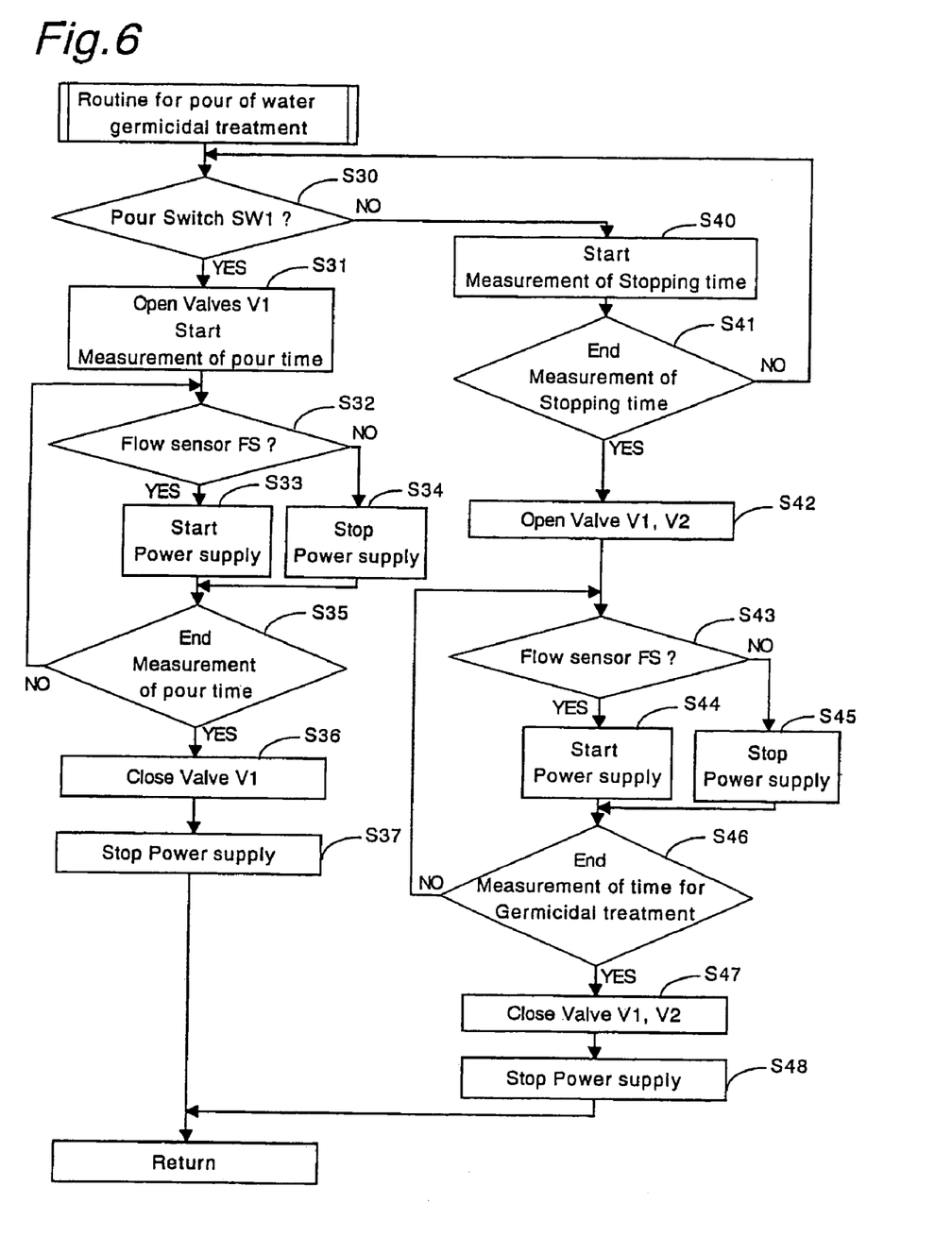
FIG. 6 is a control program of the electrolytic ion-water production apparatus executed by the microcomputer shown in FIG. 4.

When the power source switch SW and the pour switch SW1 of water in the electrolytic ion-water production apparatus are closed by a user in a condition where the main switch 12 for water supply has been opened, the computer MC determines a "Yes" answer at step S30 of the routine for pour of water and sterilization shown in FIG. 6, turns on at step S31 the first electromagnetic on-off valve V1 and starts to measure a predetermined time for pour of water. Thus, the tap water from the water supply conduit 11 is purified by the water purifier 23 to eliminate residual chlorine content therefrom and supplied into the electrolytic cell 24. When the flow of purified tap water into the electrolytic cell 24 is detected by the flow sensor FS, the computer MC determines a "Yes" answer at step S32 and applies at step S33 the control signal for supply of DC voltage to the electrodes in the electrolytic cell 24 to the electrolytic current control circuit 31. Thus, acid-ion water and alkaline-ion water are produced by electrolysis of the supplied tap water in the electrolytic cell 24. The alkaline-ion water without any residual chlorine is stored in the discharge tank T through the discharge conduit 25, while the acid-ion water is discharged into the drain tank 27 through the discharge conduit 26. Upon lapse of the predetermined time for pour of tap water, the computer MC determines a "Yes" answer at step S35, turns off the first electromagnetic on-off valve V1 at step S36 and applies at step S37 a control signal for stopping the power supply to the electrodes in the electrolytic cell 24 to the electrolytic current control circuit 31.

When the production apparatus is left after used in a condition where the power supply to the electrodes in the electrolytic cell was stopped, the computer MC starts at step S40 to measure the predetermined time for stopping (for instance, two hours). Upon lapse of the predetermined time for stopping, the computer MC determines a "Yes" answer at step S41, turns on at step S42 the first and second electromagnetic on-off valve V1 and V2 and starts to measure the predetermined time for germicidal treatment. Thus, the purified tap water from the water purifier 23 is mixed with the tap water containing residual chlorine supplied through the bypass conduit BP and is supplied into the electrolytic cell 24. When the flow of the mixed tap water is detected by the flow sensor FS, the computer MC determines a "Yes" answer at step S43 and applies at step S44 the control signal for supply of DC voltage to the electrodes in the electrolytic cell 24. Thus, the alkaline-ion water produced in the electrolytic cell is in a condition containing sodium hypochlorous acid (NaOCl) of low concentration and is discharged into the discharge tank T through the discharge conduit 25, while the acid-ion water produced in the electrolytic cell 24 is discharged into the drain tank 27 through the discharge conduit 26. Upon lapse of the predetermined time for germicidal treatment, the computer MC determines a "Yes" answer at step S46 and turns off at step S47 the first and second electromagnetic on-off valves V1 and V2. Thereafter, the computer MC applies at step S48 the control signal for stopping the power supply to the electrodes in the electrolytic cell 24 to the electrolytic current control circuit 31.

In the production apparatus stopped after operation described above, the alkaline-ion water containing sodium hypochlorous acid of low concentration is remained in the interior of the electrolytic cell 24 and the discharge conduit 25. Accordingly, even if the production apparatus is left in a non-used condition for a long period of time, propagation of harmful microbes can be prevented by durable germicidal power of sodium hypochlorous acid contained in the alkaline-ion water.

In a practical embodiment of the present invention, it is desirable that a flow quantity control valve is disposed in the downstream of the electromagnetic on-off valve V2 for supply of the tap water in the bypass conduit BP to adjust the amount of tap water supplied from the bypass conduit BP to the downstream of water purifier 23 in accordance with the quality of tap water supplied from the water supply conduit 11 and change of the atmospheric temperature. With such arrangement of the flow quantity control valve, the concentration of sodium hypochlorous acid contained in the alkaline-ion water can be adjusted to an optimal value.

What is claimed is:

1. An electrolytic ion-water production apparatus, including an electrolytic cell connected to a tap water supply conduit through a water purifier for elimination of residual chlorine to be supplied with purified tap water for producing acid-ion water and alkaline-ion water by electrolysis of the supplied tap water when applied with DC voltage at a pair of opposed electrodes provided therein, discharge conduits provided to respectively discharge acid-ion water and alkaline-ion water produced in the electrolytic cell, and a faucet provided on the discharge conduit of alkaline-ion water,
   wherein electric control means of the electrolytic ion-water production apparatus comprises:
   a first electromagnetic on-off valve bifurcated from the discharge conduit at an upstream of the faucet;
   a second electromagnetic on-off valve disposed in a bypass conduit bifurcated from the tap water supply conduit at an upstream of the water purifier and connected to the tap water supply conduit at a downstream of the water purifier;
   electrolytic current control means for applying DC voltage between said electrodes when the faucet is opened to cause flow of the purified tap water supplied into the electrolytic cell through the water purifier in a condition where both the first and second electromagnetic on-off valves have been closed and for stopping the power supply to said electrodes when the faucet is closed; and
   germicidal treatment means for starting measurement of a predetermined stopping time when the power supply to said electrodes has been stopped by closing of the faucet, opening both the first and second electromagnetic on-off valves upon lapse of the predetermined stopping time, applying DC voltage to said electrodes when the electrolytic cell is supplied with a mixture of purified water from the water purifier and the tap water from the bypass conduit, and closing both the first and second electromagnetic on-off valves and stopping the power supply to said electrodes upon lapse of a predetermined time for germicidal treatment.

2. An electrolytic ion-water production apparatus as claimed in claim 1, wherein said germicidal treatment means further includes preliminary germicidal treatment means arranged to open both the first and second electromagnetic on-off valves upon lapse of a predetermined temporal stopping time measured prior to measurement of the predetermined stopping time, to apply DC voltage to said electrodes when the electrolytic cell is supplied with a mixture of purified water from the water purifier and the tap water from the bypass conduit and to close both the first and second electromagnetic on-off valves and stop the power supply to said electrodes upon lapse of a predetermined time for preliminary germicidal treatment.

3. An electrolytic ion-water production apparatus, including an electrolytic cell connected to a tap water supply conduit through a water purifier for elimination of residual hypochlorous acid to be supplied with purified tap water for producing acid-ion water and alkaline-ion water by electrolysis of the supplied tap water when applied with DC voltage at a pair of opposed electrodes provided therein, and discharge conduits provided to respectively discharge acid-ion water and alkaline-ion water produced in the electrolytic cell,
   wherein electric control means of the electrolytic ion-water production apparatus comprises:
   a pour switch of water provided to be operated for use of the alkaline-ion water discharged from the discharge conduit;
   a first electromagnetic on-off valve disposed in the discharge conduit of alkaline-ion water;
   a second electromagnetic on-off valve disposed in a drain conduit bifurcated from the discharge conduit of alkaline-ion water at an upstream of the first electromagnetic on-off valve;
   a third electromagnetic on-off valve disposed in a bypass conduit bifurcated from the water supply conduit at an upstream of the water purifier and connected to the water supply conduit at a downstream of the water purifier;
   electrolytic current control means for opening the first electromagnetic on-off valve when the pour switch of water has been operated in a condition where both the second and third electromagnetic on-off valves were closed, applying DC voltage to said electrodes when the electrolytic cell is supplied with a mixture of purified water from the water purifier and the tap water from the bypass conduit, and closing both the second and third electromagnetic on-off valves and stopping the power supply to said electrodes upon a predetermined time for germicidal treatment.

4. An electrolytic ion-water production apparatus as claimed in claim 3, wherein said germicidal treatment means is arranged to open both the second and third electromagnetic on-off valves upon lapse of a predetermined temporal stopping time measured prior to measurement of the predetermined stopping time, to apply DC voltage to said electrodes when the electrolytic cell is supplied with a mixture of purified water from the water purifier and the tap water from the bypass conduit and to close both the second and third electromagnetic on-off valves and stopping the power supply to said electrodes upon lapse of a predetermined time for preliminary germicidal treatment.

5. An electrolytic ion-water production apparatus, including an electrolytic cell connected to a tap water supply conduit through a water purifier for elimination of residual chlorine to be supplied with purified tap water for producing acid-ion water and alkaline-ion water by electrolysis of the supplied tap water when applied with DC voltage at a pair of opposed electrodes provided therein, and discharge conduits provided to respectively discharge acid-ion water and alkaline-ion water produced in the electrolytic cell,
   wherein electric control means of the electrolytic ion-water production apparatus comprises:
   a pour switch of water provided to be operated for use of the alkaline-ion water discharged from the discharge conduit;
   a first electromagnetic on-off valve disposed in the discharge conduit of alkaline-ion water;
   a second electromagnetic on-off valve disposed in a bypass conduit bifurcated from the water supply conduit at an upstream of the water purifier and connected to the water supply conduit at a downstream of the water purifier;
   electrolytic current control means for opening the first electromagnetic on-off valve and starting measurement of a predetermined time for pour of water when the pour switch of water has been operated in a condition where the second electromagnetic on-off valve was closed, applying DC voltage to said electrodes when the electrolytic cell is supplied with purified water from the water purifier, and closing the first electromagnetic on-off valve and stopping the power supply to said electrodes upon lapse of the predetermined time for pour of water;

germicidal treatment means for starting measurement of a predetermined stopping time when the power supply to said electrodes has been stopped, opening both the first and second electromagnetic on-off valves upon lapse of the predetermined stopping time, applying DC voltage to said electrodes when the electrolytic cell is supplied with a mixture of purified water from the water purifier and the tap water from the bypass conduit, and closing both the first and second electromagnetic on-off valves and stopping the power supply to said electrodes upon lapse of a predetermined time for germicidal treatment.

6. An electrolytic ion-water production apparatus, including an electrolytic cell connected to a tap water supply conduit through a water purifier for elimination of residual hypochlorous acid to be supplied with purified tap water for producing acid-ion water and alkaline-ion water by electrolysis of the supplied tap water when applied with DC voltage at a pair of opposed electrodes provided therein, and discharge conduits provided to respectively discharge acid-ion water and alkaline-ion water produced in the electrolytic cell, wherein electric control means of the electrolytic ion-water production apparatus comprises:

a pour switch of water provided to be operated for use of the alkaline-ion water discharged from the discharge conduit;

a first electromagnetic on-off valve disposed in the discharge conduit of alkaline-ion water;

a second electromagnetic on-off valve disposed in a bypass conduit bifurcated from the water supply conduit at an upstream of the water purifier and connected to the water supply conduit at a downstream of the water purifier;

electrolytic current control means for opening the first electromagnetic on-off valve when the pour switch of water has been closed, applying DC voltage to said electrodes when the electrolytic cell is supplied with purified water from the water purifier, and closing the first electromagnetic on-off valve and stopping the power supply to said electrodes when the pour switch of water is opened;

germicidal treatment means arranged to start measurement of a predetermined stopping time when the power supply to said electrodes has been stopped, to open both the first and second electromagnetic on-off valves upon lapse of the predetermined stopping time, to apply DC voltage to said electrodes when the electrolytic cell is supplied with a mixture of purified water from the water purifier and the tap water from the bypass conduit, and to close both the first and second electromagnetic on-off valves and stop the power supply to said electrodes upon lapse of a predetermined time for germicidal treatment.

* * * * *